United States Patent Office 3,337,499

Patented Aug. 22, 1967

3,337,499

PROCESS FOR THE PREPARATION OF POLYARYLENE ETHERS

Jan Bussink, Arnhem, and Johannes Petrus van Klaveren, Rheden, Netherlands, assignors to N.V. Onderzoekings-instituut Research, Arnhem, Netherlands, a corporation of the Netherlands No Drawing. Filed June 3, 1964, Ser. No. 372,375
Claims priority, application Netherlands, June 12, 1963, 293,968
2 Claims. (Cl. 260—47)

ABSTRACT OF THE DISCLOSURE

A process for the preparation of polyarylene ethers by oxidizing 2,6-dimethylphenol with oxygen in the presence of a catalyst which comprises an amine and a copper compound selected from the group consisting of complex copper compounds formed from metallic copper and an amine, and organocopper compounds.

This invention relates to a process for the preparation of oxidation products of phenols. More particularly, it relates to a process for the preparation of high molecular weight polyarylene ethers by bringing phenols into contact with oxygen in the presence of a copper compound and a nitrogen compound.

Such a process, broadly speaking, is already known. In the known process the copper compounds used are cuprous salts that are soluble in amines, and as nitrogen compounds tertiary amines are used. In this known process it has heretofore been considered essential that the cuprous salts should be capable of changing into cupric salts. Cupric salts, as such, are therefore not suitable for use in this process. Moreover, cuprous salts, such as cuprous iodide, cuprous sulphide, and cuprous thiocyanate, which cannot change into cupric salts are likewise not suitable either.

It has now been found that the above-mentioned condition, which has heretofore been considered essential to the process, need not be satisfied, and that on the contrary good results can be obtained when use is made of copper compounds in which the copper is not in the cuprous form.

According to the present invention, therefore, the process indicated above as already known is carried out in such a way that as the copper compound use is made of copper compounds which are not to be considered as salts, e.g. organocopper compounds, and complex copper compounds which are formed from metallic copper in the absence of oxidizing agents.

In organocopper compounds the copper atom is directly linked to a carbon atom. Examples of such compounds are copper alkyls and copper aryls. These organocopper compounds can be prepared in a manner known per se, for instance by bringing cupric nitrate, in an alcoholic medium and at a low temperature, into contact with tetraethyl lead so that monoethyl copper is formed. Since monoethyl copper is stable only at low temperatures, when used in the process according to the present invention it must be employed at a temperature below −50° C. A compound such as phenylcopper may be prepared, for instance, by reacting phenylmagnesium iodide with cuprous iodide. Contrary to the case of monoethyl copper, the phenylcopper is stable at room temperature.

When one employs metallic copper it is preferred to start from "activated" copper, which may be prepared, for instance, by reducing copper sulphate with the aid of zinc. Finely divided metallic copper dissolves in the amines to be used in the process according to the present invention with the formation of colorless complex compounds which are very active catalysts.

The process according to the present invention has substantial advantages over the previously known process in which cuprous salts are used.

The greatest advantage consists in that products are obtained which are less colored than those obtained by the previously known process. Although for some applications the brown color of the products obtained by the previously known process does not necessarily constitute a drawback, nevertheless there are a great many applications in which the brown color does constitute a disadvantage so that there is a marked need for methods for the preparation of products of this kind which are not so strongly colored.

Another advantage is that the compounds which are used in the process according to the present invention are more active than the cuprous salts heretofore used so that less copper is needed than in the previously known process.

In the oxidation of phenols in the foregoing manner, low molecular weight oxidation products such as diphenoquinones or high molecular weight products are formed, depending on the reaction conditions and the nature of the phenols. Of these products the high molecular weight linear polyarylene ethers are of especial importance, because their favorable electrical, mechanical and thermal properties render them very suitable for many applications. For this reason, the present invention will hereinafter be described mainly with reference to these polymers. Moreover, in view of the fact that 2,6-dimethylphenol is the most important starting material for the preparation of high molecular weight products, the invention will hereinafter be described mainly with reference to the oxidation of this particular compound.

However, it will be understood that the process according to the present invention may also be applied to other phenols, for instance, to other 2,6-disubstituted phenols or to monosubstituted phenols or to phenol itself.

The amount of copper compound used may vary between wide limits. In general, very satisfactory results are obtained using amounts ranging from 0.01 to 0.05 mol percent of the amount of phenol to be oxidized.

The nitrogen compounds which may be used in the process according to the present invention are, inter alia, the tertiary amines which are also used in the previously known process.

Instead of employing tertiary amines, use may be made of, interalia, secondary or primary amines.

Amines with which very good results may be obtained are, for instance, pyridine, N,N,N′,N′-tetramethylethylenediamine, and diethylamine.

The amount in which the nitrogen compound is used may vary between wide limits. The most favorable results being obtained when using 2 to 10 mols of an amine per mol of the copper compound, it is preferred to use an amount lying in this range.

The process according to the present invention is preferably carried out in an organic solvent for the polymer. Solvents that are suitable are, for instance, ketones and substituted or non-substituted aliphatic, aromatic, and araliphatic hydrocarbons.

Preferably, care is taken to remove water formed in the reaction from the reaction mixture. Many ways of doing this will be readily apparent to one skilled in the art, for example, particularly favorable results are obtained if for this purpose magnesium sulphate is added to the reaction mixture, preferably in an amount of 1 mol per mol of water to be bound.

The thermal stability of the polymers obtained according to the present invention may be increased by converting the hydroxyl end-groups thereof into different groups, such as ester or ether groups, so that the oxidative degradation, which begins at the hydroxyl end-groups, is prevented.

The invention may be further elucidated with the aid of the following examples which are given by way of illustration and not by way of limitation.

*Example I*

To 6.1 g. 2,6-dimethylphenol dissolved in 125 ml. pure benzene, 6 g. magnesium sulphate, 0.5 ml. tetramethylethylenediamine and 300 mg. phenyl copper are added. Then, oxygen is passed therethrough at 60° C. with vigorous stirring. After 672 ml. oxygen has been taken up, the reaction is stopped. The reaction mixture is poured into 200 ml. methanol containing 5 ml. concentrated hydrochloric acid. The polymer formed consequently precipitates. It is filtered off, washed with methanol, and dried. The yield of polymer is 82% of the theoretical yeld. The relative viscosity is 1.4, measured in a 1% by weight solution in chloroform at 25° C.

The phenyl copper is prepared in a manner known per se by reacting phenylmagnesium iodide with cuprous iodide.

*Example II*

The procedure of Example I is repeated, except that this time as the amine use is made of 1 ml. diethylamine and the temperature at which the oxygen is passed through the mixture is now 21° C.

The yield of polymer (having a relative viscosity of 2.71) is in this instance 90% of the theoretical yield.

*Example III*

The procedure of Example I is repeated and this time instead of phenyl copper use is made of 300 mg. metallic copper. This copper is prepared by reducing copper sulphate in an aqueous medium with the aid of zinc, after which the resulting copper is successively filtered, washed with water, acetone, and ether, and then kept under ether. In this case the oxygen is passed through the mixture at a temperature of 60° C.

A polymer is obtained having a relative viscosity of 1.27. The yield is 80% of theoretical.

While specific examples of preferred methods embodying the present invention have been set forth above, it will be understood that many changes and modifications may be made in the methods of procedure without departing from the spirit of the invention. It will therefore be understood that the examples cited and the particular proportions and methods of operation set forth above are intended to be illustrative only, and are not intended to limit the scope of the invention.

What is claimed is:

1. In a process for the preparation of linear polyarylene ethers by bringing 2,6-dimethylphenol into contact with oxygen in the presence of a catalyst which comprises a copper compound and an amine, the improvement wherein the copper compound is chosen from the group consisting of complex copper compounds which are formed from metallic copper and an amine, ethyl copper and phenyl copper.

2. A process according to claim 1, wherein the copper compound is phenyl copper.

References Cited

Sicar et al., J. Electrochem. Soc. 107 164–7 (1960).

Zeiss, H. Organo-Metallic Chemistry, Reinhold, N.Y. 1960, pages 446–447 relied on.

WILLIAM H. SHORT, *Primary Examiner.*

M. GOLDSTEIN, *Assistant Examiner.*